United States Patent
Lan et al.

(10) Patent No.: US 9,462,270 B1
(45) Date of Patent: Oct. 4, 2016

(54) VIDEO FRAME ALIGNMENT IN ADAPTIVE BITRATE STREAMING

(71) Applicant: ARRIS, Inc., Suwanee, GA (US)

(72) Inventors: John Lan, Mableton, GA (US); Santhana Chari, Johns Creek, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 556 days.

(21) Appl. No.: 13/709,848

(22) Filed: Dec. 10, 2012

(51) Int. Cl.
*H04N 7/12* (2006.01)
*H04N 11/02* (2006.01)
*H04N 11/04* (2006.01)
*H04N 19/40* (2014.01)

(52) U.S. Cl.
CPC ................ *H04N 19/00472* (2013.01)

(58) Field of Classification Search
CPC ....... H04N 21/2343; H04N 21/8455–21/8456
USPC .................................................. 375/240.02
See application file for complete search history.

(56) References Cited

U.S. PATENT DOCUMENTS

| 7,173,945 B1* | 2/2007 | Liu | H04J 3/0632 370/516 |
| 8,219,711 B2* | 7/2012 | Visharam | G06F 15/16 709/246 |
| 2003/0043924 A1* | 3/2003 | Haddad | H04N 5/76 375/240.28 |
| 2010/0281042 A1* | 11/2010 | Windes | H04N 7/17327 707/756 |
| 2013/0044803 A1* | 2/2013 | Fisher | H04N 21/2343 375/240.02 |

FOREIGN PATENT DOCUMENTS

EP   1791346 A1 *   5/2007   ........... H04N 21/222

* cited by examiner

*Primary Examiner* — Jamie Atala
*Assistant Examiner* — Richard A. Hansell, Jr.
(74) *Attorney, Agent, or Firm* — Thomas A. Ward

(57) ABSTRACT

Systems, apparatus and methods can operate to generate frame aligned digital video streams encoded at different bitrates from a common digital video stream. To provide uninterrupted playback of video content when a device switches from one stream encoded at one bit rate to the same digital video stream encoded at another bitrate, the video frames of the digital video streams can be aligned. To provide for proper frame alignment between fragments representing the same frame of a digital video stream encoded at different bitrates, video encoding device(s) can mark decoded digital pictures for subsequent encoding at different bit rates when the division of a program reference clock value by the fragment period approaches an integer value.

5 Claims, 5 Drawing Sheets

VIDEO FRAME ALIGNMENT IN ADAPTIVE BITRATE STREAMING

RELATED APPLICATIONS

1. Technical Field

This disclosure relates to systems, methods and apparatus in adaptive bitrate streaming for aligning video frames associated with the same video content encoded at different bitrates.

2. Background

With the increased bandwidth available in today's packet networks the delivery of video over packet networks is growing. Packet networks and/or access networks can deliver digital video streams on a "best effort" basis to users. Best-effort implies that the network may not guarantee a specified delivery rate or a delivery time for data including video content. During periods of high network usage a user accessing a video stream may experience a poor quality of experience (QoE).

A digital video stream can be encoded using media picture experts group codecs (MPEG2/4), the related IETF standards H.264/H.265, and open container formats, among many others. In adaptive bitrate streaming, video can be encoded at different bitrates. The video stream can be made up of a series of frames. The frames can be grouped into blocks for transmission. The blocks are typically called fragments.

A customer premise equipment (CPE) and/or end user device can request a digital video stream at a specific encoded bitrate generated by video transcoding devices. The CPE and/or end user device can be directed to request a particular series of fragments to get the desired video stream at a particular bit rate. If the throughput (e.g., available bandwidth) of the packet network and/or access network deteriorates, a CPE device and/or end user device can request continued transmission of the digital video stream at a lower encoded bitrate from an adaptive bitrate streamer by requesting a different series of fragments that can encode the desired video stream at the lower bitrate. While a digital video stream encoded at a lower bitrate can be of lower quality, less network bandwidth can be required for delivery of that video content and the lower bitrate requirement can enable continuing playback and/or storage of the video content at the CPE and/or end user device instead of interruptions. As the throughput of the packet network and/or access network improves, the CPE and/or end user device can request another series of fragments with a higher encoded bitrate from an adaptive bitrate streamer to attempt to provide an improved QoE.

Video transcoding device(s) can be required to frame align the digital video streams encoded at different bitrates to allow potentially uninterrupted sequential playback and/or storage of the video content at a CPE and/or end user device when the CPE and/or end user device requests and receives fragments of a digital video stream at a different encoded bitrate. When multiple different bitrates are sourced from the same input digital video stream, it may be more than a single transcoding device can handle.

BRIEF DESCRIPTION OF THE DRAWINGS

Like reference numbers and designations in the various drawings indicate like elements.

DETAILED DESCRIPTION

In some implementations of this disclosure, methods, systems, and apparatuses can generate frame synchronized fragmented digital video streams encoded at different bitrates for delivery through packet and access networks for video decoding by CPE and/or end user devices.

In some implementations, one or more video transcoding device(s) can generate a plurality of fragmented digital video streams that can be encoded at different bitrates. In the process of video encoding, a digital video stream can include I-, B- and P-frames. I-frames can be decoded to provide a complete image where B and P frames are partial images, which require reference to other video frames (e.g., anchor frames) to decode a complete image. The video transcoding device(s) can generate instantaneous decoding reference (IDR) frames that can correspond to the start of a video fragment. The same IDR frames of a digital video stream encoded at different bitrates can result in a plurality of frame aligned fragmented digital video streams.

A digital input video stream can include a program clock reference (PCR) to provide a system timing clock for the subsequent decoding by a CPE and/or end user device. In some implementations, video transcoding device(s) can generate a plurality of frame aligned fragmented digital video streams by generating a subset of video IDR frames when the corresponding division of the PCR by a fragment period approaches an integer value.

Figure 1:
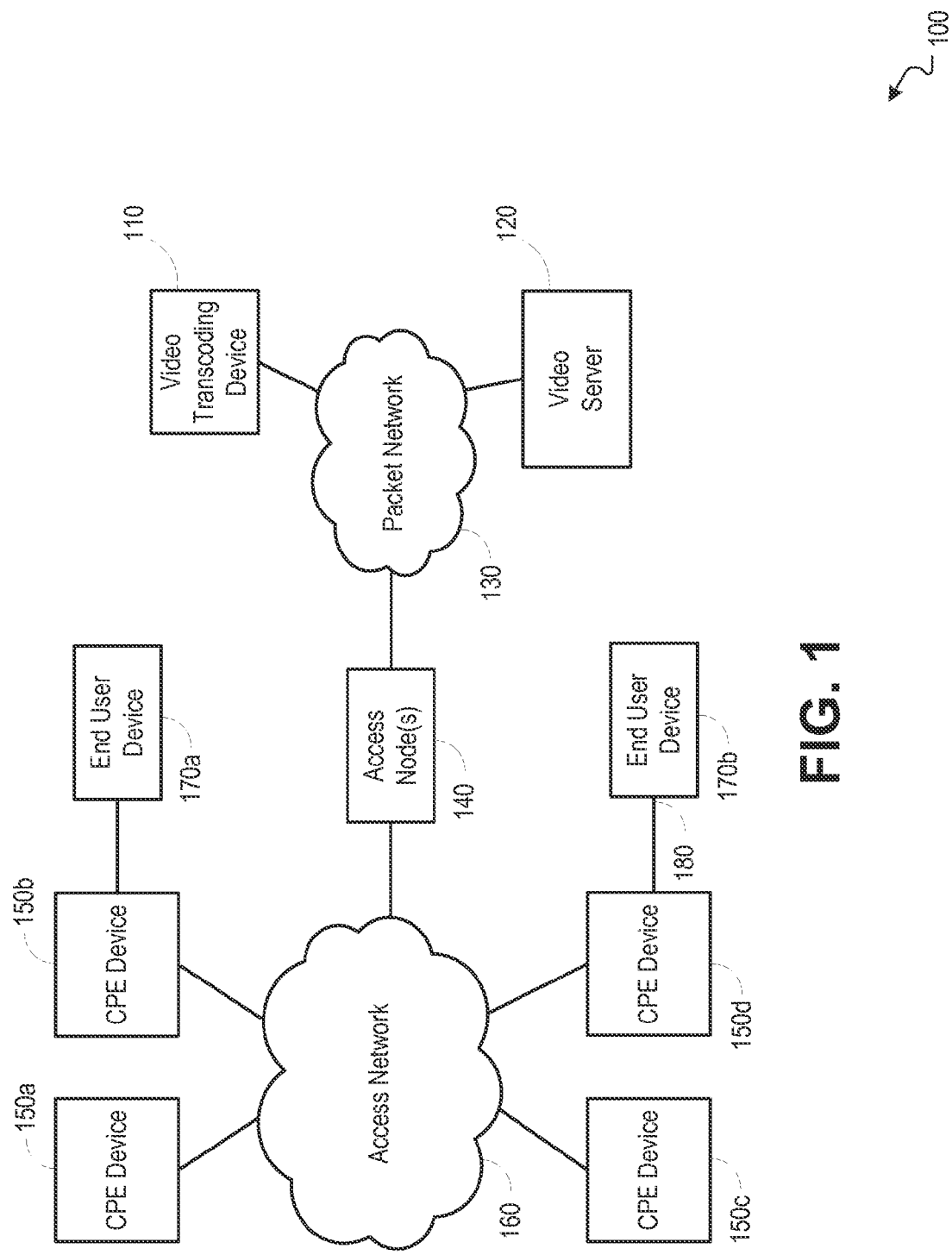
FIG. 1 is a block diagram illustrating an example network environment operable to provide adaptive bitrate streaming.

FIG. 1 is a block diagram illustrating an example network environment operable to provide adaptive bitrate streaming. In some implementations, one or more video transcoding device(s) 110 (only one shown) can provide a plurality of frame aligned digital video streams encoded at different bitrates from the same digital video stream to one or more video server(s) 120 (only one shown) through packet network 130. In other implementations, the video transcoding device 110 and video server 120 can be integrated into a single device. In some implementations, video server(s) 120 can provide adaptive bitrate streaming through the hypertext transfer protocol (HTTP). Video server 120 can provide one or more frame aligned digital video streams to access node 140. In some implementations, packet network 130 can be used to deliver frame aligned digital video streams from video server 120 to access node 140. In other implementations, the video server 120 can be directly connected to access node 140. In some implementations the packet network 130 can be an internet protocol (IP) based network. In other implementations, the packet network 130 can be based on other packet network standards.

An access node 140 can aggregate one or more frame aligned digital video streams for delivery to one or more CPE device(s) 150a-d through an access network 160. The access node 140 can be a DOCSIS-based cable modem termination system (CMTS), digital subscriber line access multiplexer (DSLAM), mobile cellular base station, wireless access point or optical line terminal (OLT). The access network 160 can be a DOCSIS-based community access television (CATV) network, digital subscriber loop (DSL), mobile cellular network (e.g., 3G, 4G, LTE, etc.), wireless network (e.g., 802.11, 802.16, etc.), fiber to the curb (FTTC), fiber to the premise (FTTP) network or other broadband access networks.

CPE device(s) 150a-d can include DOCSIS cable modems (CM)/enhanced terminal media adapters (eMTA), set top boxes, optical network units (ONUs) and DSL modems. CPE device(s) 150a-d can interface to end user device(s) 170a-b through local interface 180. The local interface 180 can be based on the Multimedia over Coax Alliance (MoCA), 802.11, Ethernet, universal serial bus (USB), G.hn specifications, or other home networking specifications. End user devices 170a-b can include personal computers, tablets, televisions, media players and cellular phones. In some implementations, CPE device(s) 150a-d and end user device(s) 170a-b can be integrated in a single device.

In some implementations, CPE device(s) 150a-d can include one or more video decoders. In other implementations, end user devices 170a-b can include one or more video decoders. In yet other implementations, one or more video decoders can reside in both CPE device(s) 150a-d and end user device(s) 170a-b.

Figure 2:
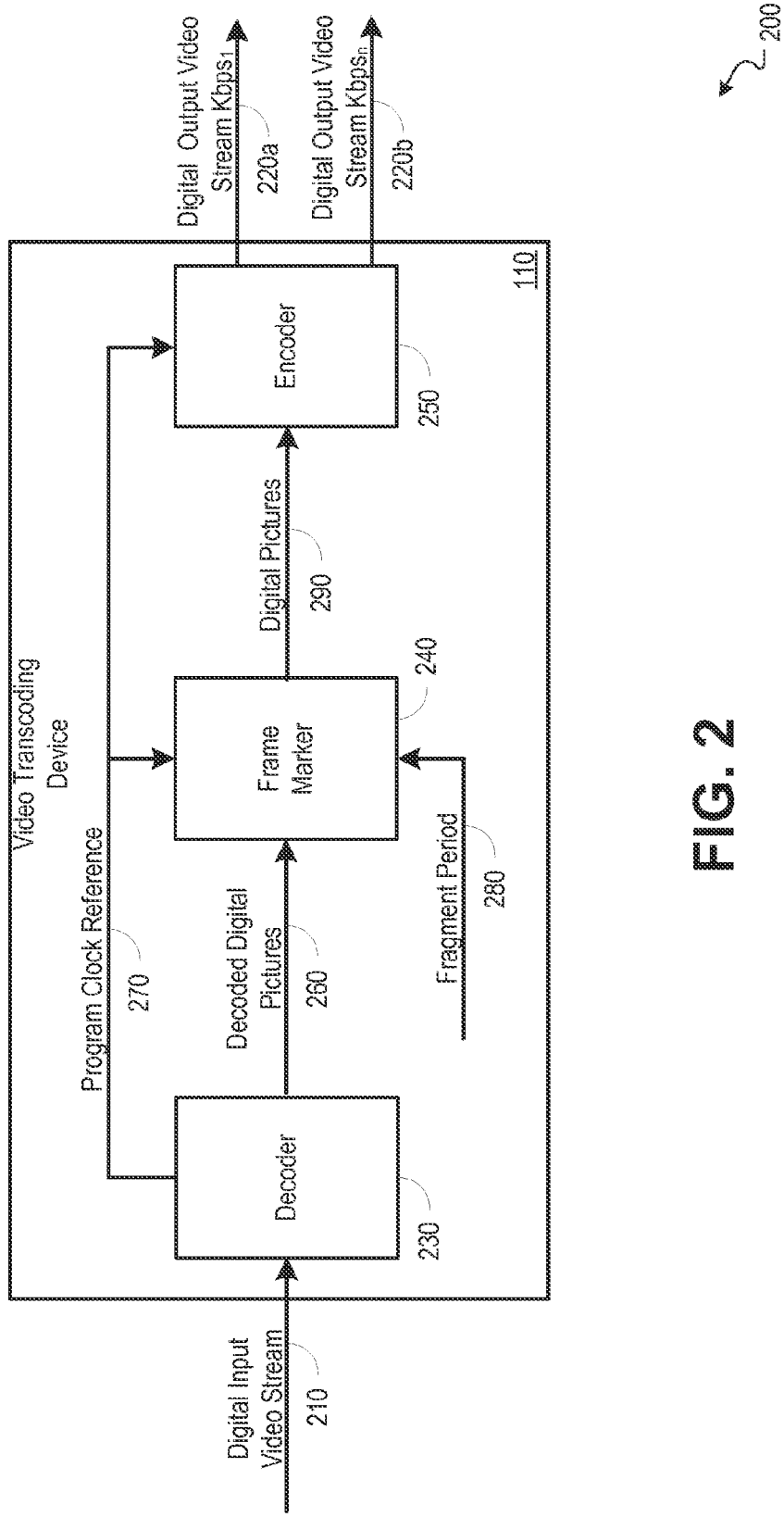
FIG. 2 is a block diagram illustrating an example video transcoding device operable to receive a digital video stream and generate one or more frame aligned fragmented digital video stream(s) at different encoded bitrates.

FIG. 2 is a block diagram illustrating an example video transcoding device operable to receive a digital video stream and generate one or more frame aligned fragmented digital video stream(s) at different encoded bitrates. Frame alignment can be achieved through generating the same IDR frames in each digital output video stream encoded at different bit rates coinciding with a fragment period (FP) 290. The video IDR frames are then used to begin fragments. The video fragments can be created and stored within the video server (e.g., video server 120 of FIG. 1).

In some implementations, video transcoding device 110 can receive an original digital input video stream 210 and generate a plurality of fragmented digital video output stream(s) 220a-b encoded at different bitrates from the same original digital input video stream 210. In other implementations, a plurality of video transcoding devices 110 can each generate one or more fragmented digital output video streams 220a-b encoded at different bitrates from the same digital input video stream 210. In another implementation, the video fragments can be created and stored within the video server (e.g., video server 120 of FIG. 1).

In some implementations, video transcoding device 110 can include a decoder 230, frame marker 240 and encoder 250. Decoder 230 can receive an original digital input video stream 210 and generate decoded digital pictures 260 and program clock reference (PCR) 270.

Frame marker 240 can receive decoded digital pictures 260, program clock reference 270 and fragment period (FP) 280 and generate digital pictures 290. In some, implementations the frame marker 240 can receive the first decoded digital picture and generate a digital picture 290 that can be marked. Frame marker 240 can then calculate a $PCR_{distribution}$ where $PCR_{distribution}=PCR/Int\ (PCR/FP)$ for subsequent decoded digital pictures 290. If the current decoded digital picture 290 $PCR_{distribution}$ value is less than the previous decoded digital picture 290 $PCR_{distribution}$ value the frame marker 240 can generate a marked digital picture 290. Otherwise, the frame marker 240 transparently passes the decoded digital picture 260 to digital picture 290.

Encoder 260 can receive digital pictures 290 where a subset of the pictures are marked and generate fragmented digital output video stream(s) 220a-b encoded at different bitrates. Encoder 260 can encode digital pictures 290 into video frames. A video frame can be an I-, B-, or P-frame. In some implementations, if encoder 260 receives a digital picture 290 that has been marked by frame marker 240 the digital picture 290 will be encoded as an IDR Frame.

Figure 3:
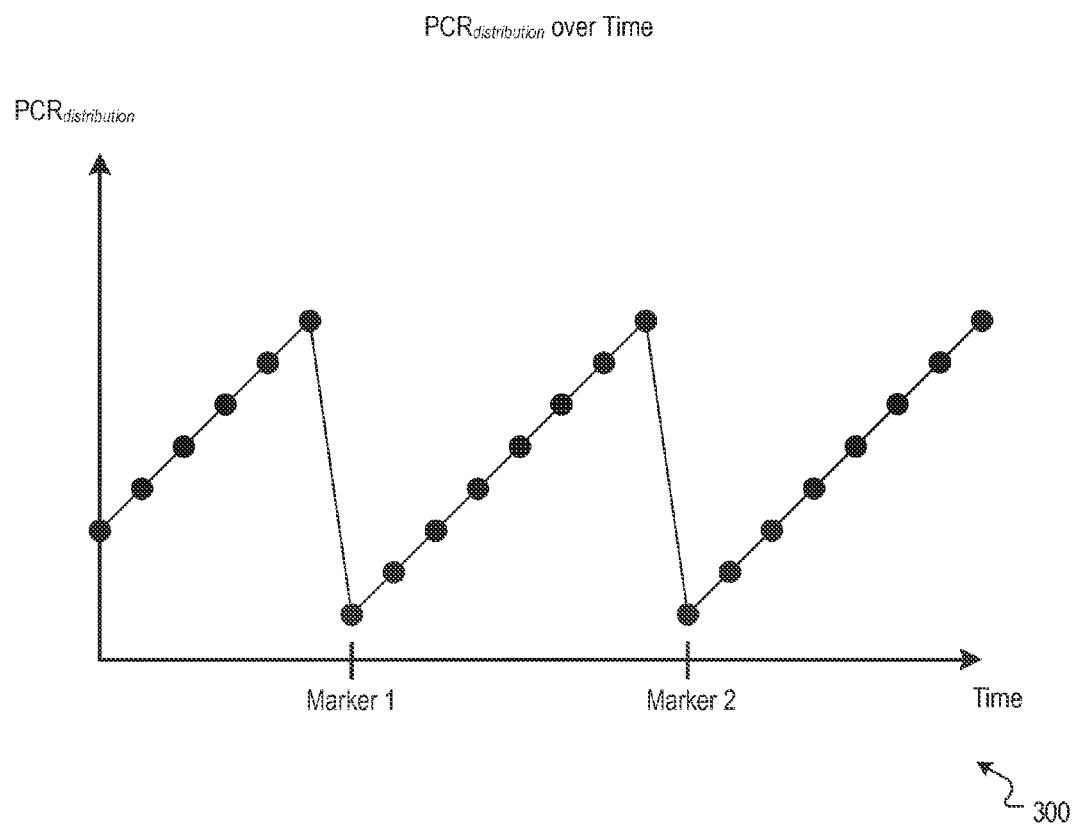
FIG. 3 is a graph illustrating an example of program clock reference distribution over time.

FIG. 3 is a graph illustrating an example of program clock reference distribution values over time. The frame marker (e.g., frame marker 240 of FIG. 2) can calculate a $PCR_{distribution}$ for each decoded digital picture (e.g., digital picture 260 of FIG. 2) as illustrated in graph 300. The slope of a line intersecting the $PCR_{distribution}$ values of each decoded digital picture can be positive or negative. The frame maker can mark a decoded digital picture, as indicated as maker 1 and marker 2 on graph 300 when a $PCR_{distribution}$ value results in a negative slope that coincides with the division of the PCR (e.g., PCR 270 of FIG. 2) by the fragment period (e.g., fragment period 290) approaching an integer value.

Figure 4:
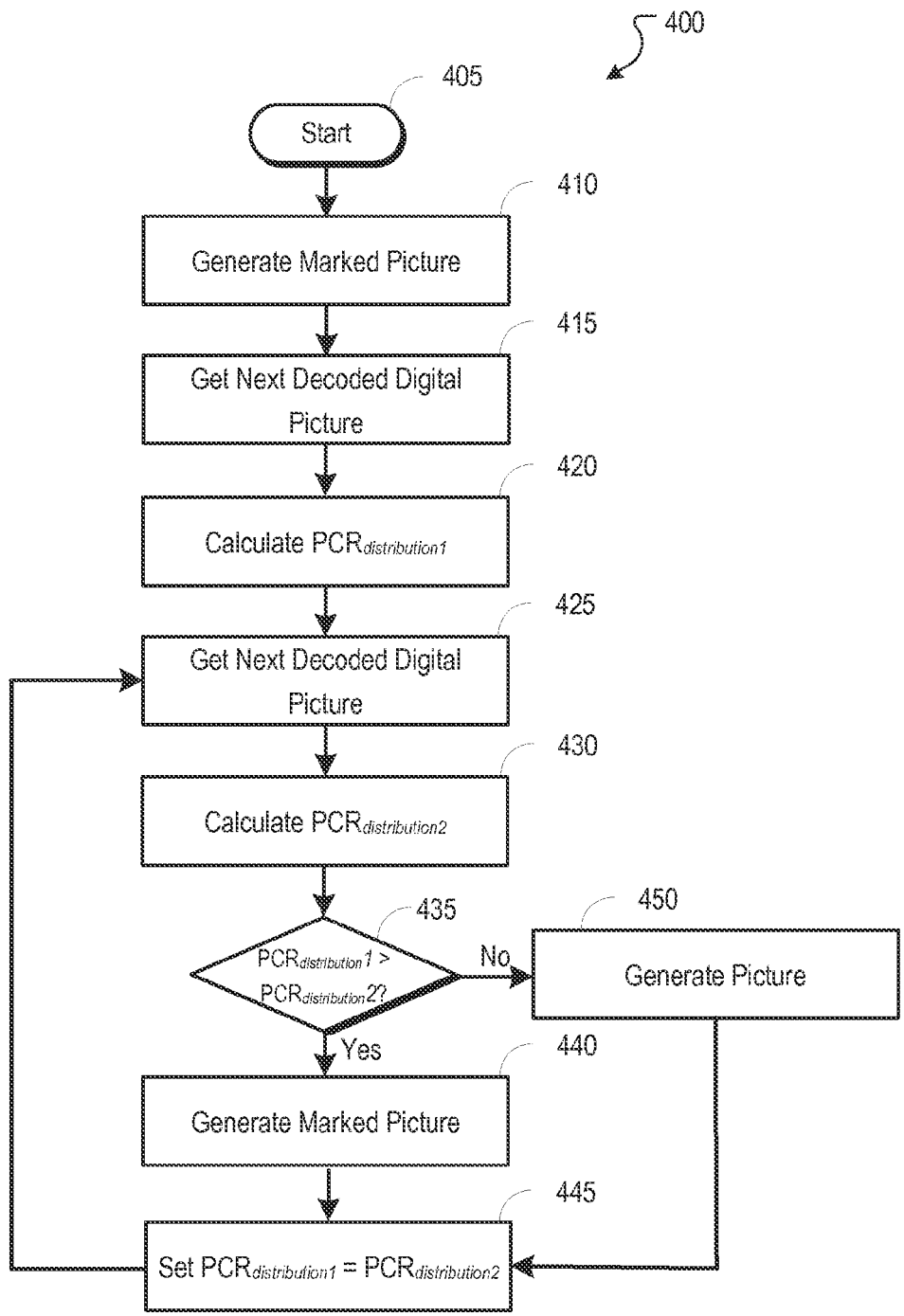
FIG. 4 is a flow chart illustrating an example process that can be used by a video encoding device for marking decoded digital pictures.

FIG. 4 is a flow chart illustrating an example process that can be used by a video encoding device for marking decoded digital pictures. The process 400 starts at stage 405 where the first digital decoded picture (e.g., digital decoded picture of FIG. 2) associated with a digital input video stream (e.g., digital input video stream 210 of FIG. 2) can be received. The first digital decoded picture can be received, for example, by the frame marker (e.g., frame marker 240 of FIG. 2).

At stage 410, a marked digital picture (e.g., digital pictures 290 of FIG. 2) can be generated. The marked digital picture can be generated, for example, by a frame marker (e.g., frame marker 240 of FIG. 2).

At stage 415, the next decoded digital picture can be received. The next decoded digital picture, for example, can be received by the frame marker (e.g., frame marker 240 of FIG. 2).

At stage 420, a PCR distribution value associated with the decoded digital picture (i.e., $PCR_{distribution1}$) can be calculated. The PCR distribution value can be calculated, for example, by the frame marker (e.g., frame marker 240 of FIG. 2).

At stage 425, the next decoded digital picture can be received. The next decoded digital picture, for example can be received by the frame maker (e.g., frame marker 240 of FIG. 2).

At stage 430, a PCR distribution value associated with the decoded digital picture (i.e., $PCR_{distribution2}$) can be calculated. The PCR distribution value can be calculated, for example, by the frame marker (e.g., frame marker 240 of FIG. 2).

At stage 435, a determination can be made if the $PCR_{distribution1}$ value can be greater than the $PCR_{distribution2}$ value. If the $PCR_{distribution1}$ is less than the $PCR_{distribution2}$ value, process 400 proceeds to stage 450. If the $PCR_{distribution1}$ is greater than the $PCR_{distribution2}$ value, process 400 proceeds to stage 440. The determination can be made, for example, by the frame marker (e.g., frame marker 240 of FIG. 2).

At stage 440, a marked digital picture can be generated. The marked digital picture can be generated, for example by the frame marker (e.g., frame marker 240 of FIG. 2).

At stage 445, the $PCR_{distribution1}$ value can be updated to the $PCR_{distribution2}$ value. The $PCR_{distribution1}$ value can be updated, for example, by the frame marker (e.g., frame marker 240 of FIG. 2). Process 400 then returns to stage 425.

At stage 450, a non-marked digital picture can be generated. The non-marked digital picture can be generated, for example by the frame marker (e.g., frame marker 240 of FIG. 2). Process 400 then proceeds to stage 445.

Figure 5:
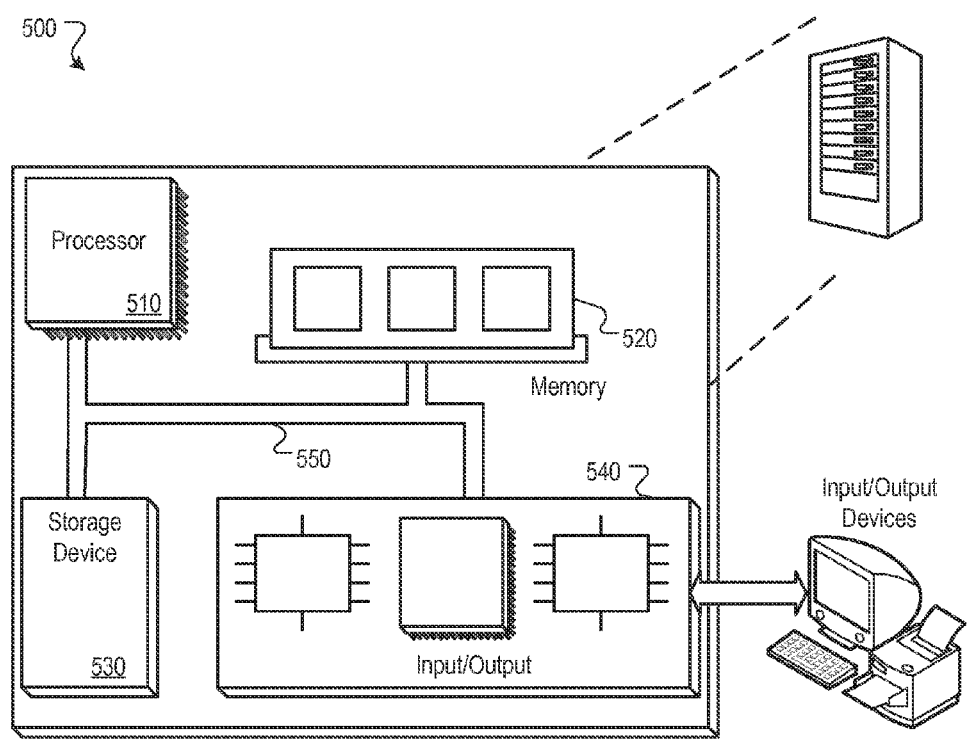
FIG. 5 is a block diagram illustrating an example of a video encoding device operable to encode a digital video stream with fragment markers.

FIG. 5 is a block diagram illustrating an example of a video encoding device operable to encode a fragmented digital video stream. Video encoding device 500 can include a processor 510, a memory 520, a storage device 530, and an input/output device 540. Each of the components 510, 520, 530, and 540 can, for example, be interconnected using a system bus 450. The processor 510 is capable of processing instructions for execution within the video coding device 500. In one implementation, the processor 510 is a single-threaded processor. In another implementation, the processor 510 is a multi-threaded processor. The processor 510 is capable of processing instructions stored in the memory 520 or on the storage device 530. The processor 510 can be a complex of one or more processors.

The memory 520 stores information within the system 500. The memory 520 is a computer-readable medium. In various implementations, the memory 520 can include a volatile memory unit, a non-volatile memory unit, or combinations thereof.

In some implementations, the storage device 530 is capable of providing mass storage for the video coding device 500. In one implementation, the storage device 530 is a computer-readable medium. In various different implementations, the storage device 530 can, for example, include a hard disk device, an optical disk device, flash memory or some other large capacity storage device.

The input/output device 540 provides input/output operations for the video coding device 500. In one implementation, the input/output device 540 can include one or more interfaces for enabling communication over packet-based broadband networks. In another implementation, the input/output device can include driver devices configured to receive input data and send output data to other input/output devices, such as one or more computers as well as sending communications to, and receiving communications from a network (not shown).

The video encoder device (e.g., video encoder device 110 of FIG. 1 of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. A system, comprising:
   one or more video transcoding devices operable to receive a common digital input video stream wherein the video transcoding devices comprise:
   a decoder operable to decode the common digital input video stream and generate a plurality of digital decoded pictures;
   a frame marker operable to receive the digital decoded pictures and generate marked and non-marked digital pictures; and
   an encoder operable to receive the marked and non-marked digital pictures and generate a plurality of frame aligned fragmented digital output video streams encoded at different bitrates comprising a plurality of encoded video frames;
   wherein the encoder is further operable to begin each fragment with a marked digital picture encoded as an instantaneous decoding refresh reference (IDR)-frame,
   wherein the frame marker marks the first digital picture received,
   wherein the frame marker marks subsequent digital pictures, wherein the division of a program clock reference value associated with the digital decoded pictures by a fragment period is one of an integer value and approaching an integer value,
   wherein the one of integer value and approaching an integer value is determined through a slope change in an analysis of program clock reference distribution values associated with the decoded digital pictures, and
   wherein the program clock reference distribution is calculated as PCRdistribution=PCR/Int (PCR/Fragment Period).

2. The system of claim 1, wherein the frame aligned fragmented digital output video streams is encoded in one of MPEG2, MPEG4, H.264, H.265 and open container format (Ogg).

3. The system of claim 1, wherein a video server stores the frame aligned fragmented digital output video streams encoded at different bitrates.

4. The system of claim 3, wherein the one or more video transcoders are integrated with the video server.

5. The system of claim 1, wherein at least one of the video transcoder devices comprises one or more video decoders, frame markers and video encoders.

* * * * *